United States Patent Office 3,137,379
Patented June 16, 1964

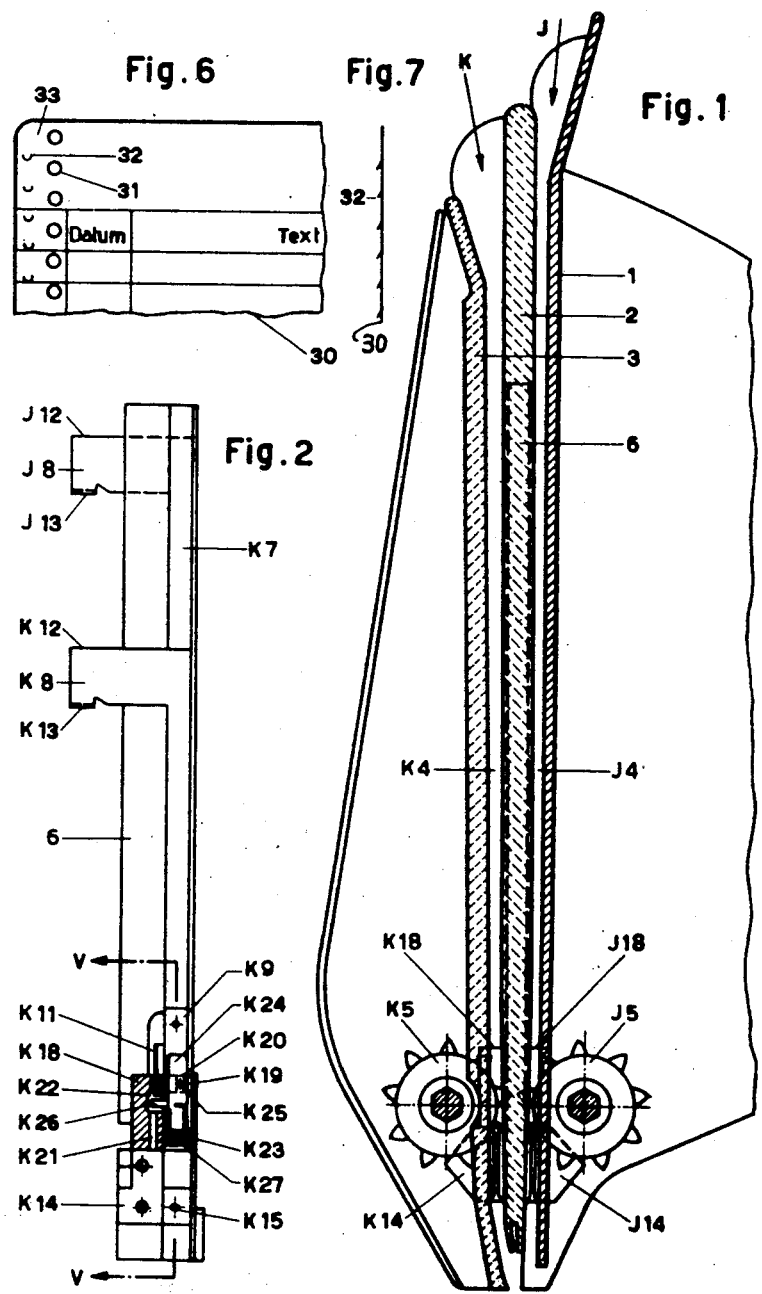

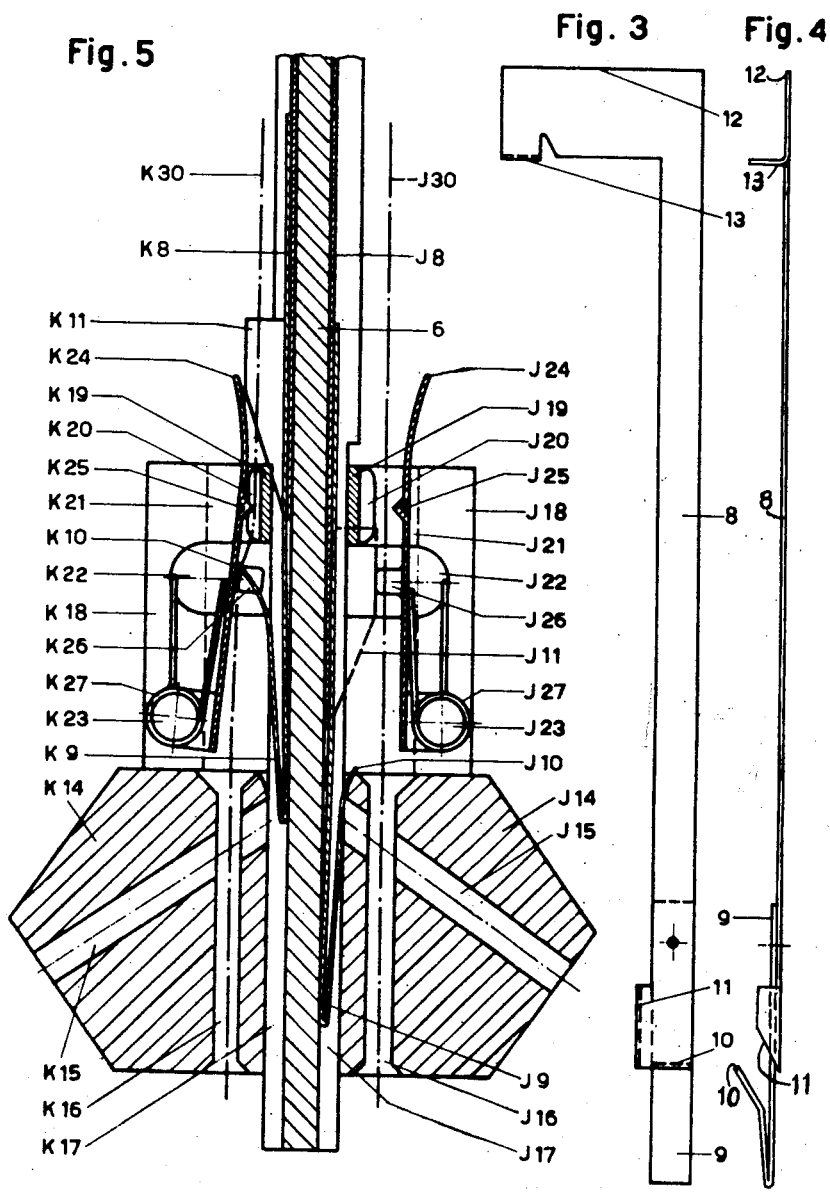

3,137,379
SENSING DEVICE
Max Oberholzer and Walter Reber, Bern, Switzerland, assignors to Ruf-Buchhaltung Aktiengesellschaft, Zurich, Switzerland
Filed Feb. 20, 1961, Ser. No. 90,343
Claims priority, application Switzerland Mar. 23, 1960
2 Claims. (Cl. 197—128)

The present invention relates to a sensing device for detachable auxiliary devices used in connection with accounting machines and typewriters. By the co-operation of a sensing device with markings provided on the margins of the sheets these sheets are adjusted by means of such detachable auxiliary devices to the line provided for typing.

With known detachable auxiliary devices of this kind scales are punched out of the margin of the sheet for marking the line typed upon last. In order to be able to sense these paper scales the scale must protrude so far beyond the sheet that the hook of a sensing member arranged on the testing slider can abut them.

When a scale has been pressed flush into the account sheet by inappropriate storage the scale has to be pushed out again before being abutted by the sensing member. In order to attain this, hitherto the margin of the sheet had to be pressed by the spring bias of the sensing member over an edge provided on the guide slot for the paper. For this purpose the spring force of the sensing member had to be so selected that it sufficed on the one hand for pushing the markings out, while on the other hand the sensing member had to be prevented from being forced by the spring force into abutting an unevenness of the paper surface and thereby unintentionally initiating the testing operation.

The invention has the object of separating the operations of pushing out and of sensing the markings.

With this and other objects in view which will become apparent later from this specification and the accompanying drawings we provide a sensing device for a detachable auxiliary device to be used in conjunction with an accounting machine or typewriter and in co-operation with markings of the sheets adjusting the latter to a line to be typed upon, comprising in combination: a rocker pivotally mounted on the said auxiliary device, spring means biasing the said rocker against the sheets and preparing the markings provided thereon, and a sensing member capable of subsequently sensing the said markings without applying a pressure to the same in the sense of pushing the same out of the said sheet.

These and other features of our said invention will be clearly understood from the following description of an embodiment thereof given by way of example with reference to the accompanying drawings in which:

FIG. 1 is a section of a detachable auxiliary device with built-in sensing device;

FIG. 2 shows the sensing device, partly in section, as viewed from the left of FIG. 1;

FIGS. 3 and 4 show a testing slider from the front and side, respectively, on a larger scale.

FIG. 5 is a section on the line V—V of FIG. 2 on a larger scale, and

FIGS. 6 and 7 show part of the margin of a sheet from the front and from the side, respectively.

FIGS. 1, 2 and 5 show sensing devices combined on the same rail for two sheets, for example a journal sheet J and an account sheet K. In FIG. 1 only those parts of the detachable auxiliary device are illustrated which are required for the understanding of the invention. In FIGS. 1–5, the hereinafter described elements are identified in connection with a journal sheet by numerals provided with the prefix J and those elements identified in connection with an account sheet have numerals provided with the prefix K. In FIGS. 6 and 7 the prefix has been omitted for the sake of brevity.

On the rear wall 1 of the detachable auxiliary device two plates 2 and 3 of Plexiglas are arranged to define guide slots J4 and K4 for the sheets J and K, respectively. The transporting wheels J5 and K5 reach with their teeth into the guide slots J4 and K4 for the sheets, and mesh there with the perforations 31 provided on the margins 33 of the sheets. For the purpose of typing upon a journal- or account-sheet 30 the same is dropped into the corresponding guide slot J4 or K4 for the respective sheet, and is subsequently pulled by the transporting wheel J5 or K5 into the detachable auxiliary device in a manner not described in more detail.

On one of the end faces of the Plexiglas plate 2 serving as a middle wall the rail 6 of the sensing device is built-in between the two guide slots J4 and K4 for the sheets. On both sides of the rail 6 longitudinal grooves J7 and K7 are provided, wherein the testing sliders J8 and K8 can slide to-and-fro. For the sake of brevity, the test slider 8 shown in FIGS. 3 and 4 has been described without a prefix in front of an identifying reference numeral and it is to be understood that the shown test slider 8 is utilized with each of the sheets J and K. At the lower end of each testing slider 8, a leaf spring 9 is fixed, the hook 10 of which stands off the testing slider 8 by its own resiliency. Moreover each testing slider 8 is provided with a laterally arranged ramp 11. The upper edge 12 and the lug 13 turned up at a right angle serve for adjusting the testing slider 8 into the various positions along the rail 6, in a manner not described in more detail.

At a short distance above the lower edge of the rail 6 punch-blocks J14 and K14 are fixed. The bores J15 and K15 in the punch-blocks serve for the guidance of punches (not shown), by means of which after each booking operation scab-shaped markings 32 are punched into the margins 33 of the sheet. These margins 33 of the sheets are guided in the slots J16 and K16 by means of the punch blocks. By the longitudinal grooves J7 and K7 of the rail 6 and by the rear faces of the punch blocks J14 and K14 pockets J17 and K17 are formed, into which the hooks J10 and K10 respectively, of the leaf springs can be pushed.

Immediately above the punch-blocks J14 and K14 the two supports J18 and K18 are fixed to the rail 6. Each support J18 and K18 has a contact surface J19 and K19 extending transversely across the testing slider J8 and K8 and provided with a groove J20 and K20, respectively. The longitudinal groove J21 and K21 in the supports J18 and K18 serves for the passage of the respective ramp J11 and K11 laterally arranged on the corresponding testing slider J8 and K8. Each opening J22 and K22 on the supports J18 and K18 issues into its corresponding longitudinal groove J21 and K21. Moreover the supports J18 and K18 are provided with pivot pins J23 and K23, on which the rockers J24 and K24 are mounted rotatably. Each of these rockers has a boss J25 and K25 and a slide ridge J26 and K26 turned off at a right angle. Each slide ridge J26 and K26 turned off at a right angle reaches into the opening J22 and K22, so that it can bear on the ramp J11 and K11, respectively. By the torsion springs J27 and K27 mounted on the pivot pins J23 and K23 the rockers J24 and K24 are forced against the contact faces J19 and K19 or against the margins 33 of the sheets, respectively.

In the FIG. 5 the testing slider J8 of the journal sheet J30 is illustrated in its lowest position, and the testing slider K8 of the account sheet K30 in its highest position. In the lowest position of the testing slide J8 the hook J10 of the leaf spring has been pushed into the pocket J17, and has thereby been rendered ineffective. The ramp J11 on the testing slider J8 effects by means of the slide ridge J26 that the rocker J24 is lifted off the contact surface J19. In this position of the testing slider J8 the sensing device is rendered ineffective, so that the lower edge of the sheet J30 can pass unhampered by the rocker J24 and subsequent hook 10.

By pulling the testing slider up into its upper position the sensing device is rendered effective. In this position, illustrated on the left hand side of FIG. 5, the ramp K11 is shifted out of range of the slide ridge K26, so that the torsion spring K27 can bias the rocker K24 against the contact face K19 and the margin 33 of the sheet 30, respectively. When inserting a sheet 30, the boss K25 bears from the rear against the scale-shaped markings 32. Since the markings can give way in the direction of the groove K20, they are brought into the inclined position illustrated in FIG. 7.

This pushing-out of the scale-shaped markings 32 is of particular importance when a sheet 30, after a prolonged and perhaps in appropriate storage, during which the markings had been flattened by pressure, is dropped again into the detachable auxiliary device.

In the further course of the sheet K30 through the detachable auxiliary device the markings 32 abut the hook K10 and pull the testing slider K8 down, until the sheet K30, controlled by the edge K12 of the testing slider in a manner not described in detail, is arrested at the line provided for being typed upon.

While we have herein described what may be considered a typical and particularly useful embodiment of our said invention, we wish it to be understood that we do not limit ourselves to the particular details and dimensions described and illustrated; for obvious modifications will occur to a person skilled in the art.

What we claim as our invention and desire to secure by Letters Patent, is:

1. In a sheet sensing device for a printing machine in which a previously printed sheet is provided with protruding markings to indicate a line of previous printing on such sheet, the combination comprising guide plate means attached to the printing machine, support means on said guide plate means, said support means including a sheet contacting surface having a groove therein, a spring biased rocker pivotally mounted on said support means and being normally biased toward said contacting surface, boss means disposed on said rocker so as to be normally biased therewith into said groove whereby a protruding marking provided on the previously printed sheet is engaged by said boss means so as to be prepared for sensing, a slide element carried by said support means, and a sensing tip on said slide element normally biased toward said rocker to sense a protruding marking on a sheet inserted between said rocker and said sheet contacting surface.

2. The combination as recited in claim 1 wherein said rocker has a slide ridge disposed toward said slide element, and said slide element has a ramp fixed thereto, said ramp engaging said slide ridge to pivot said rocker against its bias to an inoperative position when said slide element is moved to a sheet inserting position.

References Cited in the file of this patent

UNITED STATES PATENTS

| 1,985,178 | Loeb | Dec. 18, 1934 |
| 2,424,073 | Ayes | July 15, 1947 |
| 2,670,068 | Rutishauser et al. | Feb. 23, 1954 |
| 2,831,560 | Oberholzer et al. | Apr. 22, 1958 |
| 2,916,129 | Parker | Dec. 8, 1959 |

FOREIGN PATENTS

| 1,080,125 | Germany | Apr. 21, 1960 |